United States Patent Office 3,242,039
Patented Mar. 22, 1966

3,242,039
FUNGICIDAL NITRO SUBSTITUTED ALKYL OXO-LOWER ALKYLCARBOXYLATES
Paul J. Stoffel, St. Louis, and David J. Beaver, Richmond Heights, Mo., assignors to Monsanto Company, a corporation of Delaware
No Drawing. Original application May 21, 1961, Ser. No. 112,234, now Patent No. 3,160,655, dated Dec. 8, 1964. Divided and this application Mar. 12, 1964, Ser. No. 351,535
12 Claims. (Cl. 167—22)

This application is a division of co-pending application Serial No. 112,234, filed May 24, 1961, now U.S. 3,160,655.

This invention relates to novel ketocarboxylates. Additionally this invention relates to fungicidal methods and compositions employing at least one ketocarboxylate of this invention as an active ingredient.

In accordance with this invention it has been found that upon application to fungal organisms and/or their horticultural habitats at least one ketocarboxylate of this invention effective control thereof is obtained. The ketocarboxylates of this invention are nitro substituted alkyl esters of aliphatic ketocarboxylic acids of the formula $$R-\underset{\underset{O}{\|}}{C}-O-Z$$

wherein Z is a nitro substituted alkyl radical containing 2 to 6 carbon atoms the nitro substituent of which being attached to a carbon atom at least one carbon atom removed from the carbonyloxy radical to which it is attached as indicated above, and wherein R is an oxoalkyl radical containing 2 to 7 carbon atoms the terminal group of which radical being $CH_3$— (e.g.

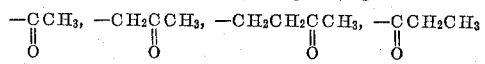

etc.).

As illustrative of Z but not limitative thereof are 2-nitroethyl, 2-nitropropyl, 2-nitrobutyl, 2-nitroamyl, 2-nitrohexyl, 3-nitropropyl, 3-nitrobutyl, 4-nitrobutyl, 4-nitroamyl, 6-nitrohexyl, etc., and the various nitro substituted alkyl isomers and homologues thereof containing 2 to 6 carbon atoms the nitro substituent of which being attached to a carbon atom at least one carbon atom removed from the carbonyloxy group to which it is attached.

As illustrative of R but not limitative thereof are 1-oxoethyl (or acetyl), 1-oxopropyl (or propionyl), 1-oxo-n-butyl, 1-oxo-n-pentyl, 1-oxo-n-heptyl, 2-oxopropyl (or acetonyl), 2-oxo-n-butyl, 1-methyl-2-oxo-n-propyl, 1-ethyl-2-oxo-n-propyl, 2-oxo-n-heptyl, 3-oxobutyl, 3-oxo-n-pentyl, 2,4-dimethyl-3-oxopentyl, 4-oxo-n-heptyl, 5-oxo-n-heptyl, 6-oxo-n-heptyl, etc., and their various straight and branched chain oxoalkyl isomers and homologues containing up to 7 carbon atoms which radicals terminate with $CH_3$—.

Of this class of ketocarboxylates a particularly useful group are those of the formula

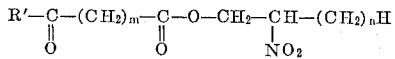

wherein R' is an alkyl radical containing 1 to 3 carbon atoms (i.e. methyl, ethyl, propyl or isopropyl), wherein $m$ is an integer from 0 to 3, inclusive, but preferably 2, and wherein $n$ is an integer from 0 to 3, inclusive.

As illustrative of the ketocarboxylates of this invention but not limitative thereof are 2-nitroethyl pyruvate, 2-nitro-n-propyl pyruvate, 3-nitropropyl pyruvate, 1-nitroprop-2-yl pyruvate, 2-nitro-n-butyl pyruvate, 4-nitrobutyl pyruvate, 2-nitro-n-amyl pyruvate, 2-nitroethyl 3-oxo-n-butyrate, 2-nitro-n-butyl 3-oxo-n-butyrate, 2-nitroethyl 2-methyl-3-oxo-n-butyrate, 2-nitroethyl 2-ethyl-3-oxo-n-butyrate, 2-nitroethyl 2-propyl-3-oxo-n-butyrate, 2-nitro-n-butyl 2,2-dimethyl-3-oxo-n-butyrate, 2-nitroethyl levulinate, 2-nitro-n-butyl levulinate, 4-nitrobutyl levulinate, 6-nitrohexyl levulinate, 2-nitroethyl 5-oxo-n-hexanoate, 2-nitroethyl 2-oxo-n-butyrate, 2-nitroethyl 2-oxo-n-pentanoate, 1-nitro-n-but-2-yl 3-oxo-n-pentanoate, 2-nitro-n-butyl 5-oxo-n-octanoate, etc.

As illustrative of the preparation of the ketocarboxylates of this invention but not limitative thereof is the following:

Example I

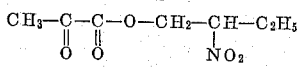

To a suitable reaction vessel equipped with a thermometer, agitator, and glass packed distilling column is charged 35.7 parts by weight of 2-nitro-n-butanol, 25 parts by weight of methyl pyruvate and 1 part by weight of p-toluene sulfonic acid. While agitating the reaction mass is heated to 130° C. and held at that temperature for 16 hours. The reaction mass is then distilled to remove overhead the azeotrope of methanol and methyl pyruvate. The oily residue is then fractionally distilled under vacuum. The fraction collected at 108–110° C. at 0.3 mm. Hg, a syrupy liquid, is 2-nitro-n-butyl pyruvate.

*Analysis.*—Theory: 7.4% N. Found: 7.53% N.

Example II

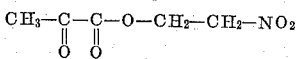

Employing the procedure of Example I but replacing 2-nitro-n-butanol with an equimolecular amount of 2-nitroethanol there is obtained 2-nitroethyl pyruvate.

Example III

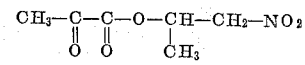

Employing the procedure of Example I but replacing 2-nitro-n-butanol with an equimolecular amount of 1-nitropropan-2-ol there is obtained 1-nitroprop-2-yl pyruvate.

Example IV

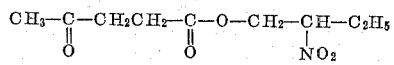

To a suitable reaction vessel equipped with a thermometer, agitator and off-gas tube is charged 47.6 parts by weight of 2-nitro-n-butanol. At room temperature and while agitating is added dropwise 40.3 parts by weight of levulinoyl chloride. During the addition hydrogen chloride evolves freely and is vented off through the off-gas tube, the temperature of the reaction mass gradually rising to 50° C. The reaction mass upon completion of the halide addition is then heated at 50° C. for 3 hours, cooled to room temperature, and then taken up with 100 parts by weight of diethyl ether. The organic solution is washed with three portions of water and then dried over anhydrous calcium chloride. The so-dried organic solution is then evaporated under vacuum to remove the low boiling volatiles. The residue is then fractionally distilled and the fraction collected at 133–135° C. at 0.7 mm. Hg, an oil, is 2-nitro-n-butyl levulinate.

*Analysis.*—Theory: 6.45% N. Found: 6.46% N.

Example V

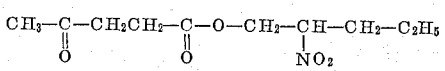

Employing the procedure of Example IV but replacing 2-nitro-n-butanol with an equimolecular amount of 2- nitro-n-pentanol there is obtained 2-nitro-n-pentyl levulinate.

*Example VI*

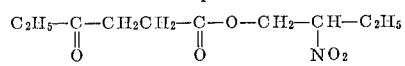

Employing the procedure of Example IV but replacing levulinoyl chloride with an equimolecular amount of 4-oxo-n-hexanoyl chloride (sometimes termed homolevulinoyl chloride) there is obtained 2-nitro-n-butyl 4-oxo-n-hexanoate.

*Example VII*

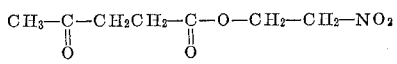

To a suitable reaction vessel equipped with a thermometer, agitator and off-gas tube is charged 31 parts by weight of 2-nitroethanol. At room temperature and while agitating is added dropwise 45 parts by weight of levulinoyl chloride. During the addition hydrogen chloride evolves freely and is vented off through the off-gas tube, the temperature of the reaction mass gradually rising to 50° C. Upon completion of the chloride addition the reaction mass is heated at 50° C. for 4 hours, cooled to room temperature, and then taken up with 100 parts by weight of diethyl ether. The organic solution is washed three times with water and then dried over anhydrous calcium chloride. The so-dried organic solution is then evaporated under vacuum to remove the volatiles. The residue, an oil, is 2-nitroethyl levulinate.

*Example VIII*

$$CH_3-C-CH_2CH_2CH_2-C-O-CH_2-CH_2-NO_2$$
$$\quad \| \qquad\qquad\qquad \|$$
$$\quad O \qquad\qquad\qquad\quad O$$

Employing the procedure of Example VII but replacing levulinoyl chloride with an equimolecular amount of 5-oxo-n-hexanoyl chloride there is obtained 2-nitroethyl 5-oxo-n-hexanoate.

*Example IX*

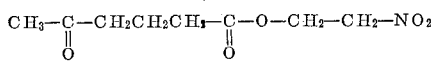

To a suitable reaction vessel equipped with a thermometer, agitator, reflux condenser and Dean-Stark trap for collecting the water by-product is charged 29 parts by weight of 2-nitro-n-butanol, 25 parts by weight of 2-oxobutyric acid, and 1 part by weight of p-toluene sulfonic acid. The mass while agitating is heated to 100° C. and held at that temperature for 6 hours. The reaction mass is cooled to room temperature and then taken up with 100 parts by weight of diethyl ether. The organic solution is washed three times with water and then dried over anhydrous calcium chloride. The so-dried organic solution is then evaporated under vacuum to remove the low boiling volatiles. The residue is then fractionally distilled, the fraction collected at 119–121° C. at 1.2 mm. Hg, an oil, is 2-nitro-n-butyl 2-oxo-butyrate.

*Analysis.*—Theory: 6.9% N. Found: 6.75% N.

*Example X*

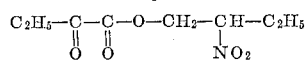

Employing the procedure of Example IV but replacing 2-nitro-n-butanol with an equimolecular amount of 2-nitro-n-pentanol and replacing levulinoyl chloride with an equimolecular amount of 4-oxo-heptanoyl chloride there is obtained 2-nitro-n-pentyl 4-oxo-heptanoate.

The esters, i.e. ketocarboxylates, of this invention are useful in combatting a large variety of fungal organisms. They are particularly effective when applied directly to soil for controlling soil borne pathogenic fungi. To illustrate the fungicidal activity of the esters of this invention but not limitative thereof is the following.

An intimate mixture of 2 volumes of yellow corn meal and 3 volumes of white sand is infested with a particular pathogen (below itemized) and incubated for two weeks at 20° C. Then one volume of this infested mixture is blended uniformly with 3 volumes of a good grade of top soil which had been sterilized. To accomplish complete blending the composite of soil and infested mixture is passed through a No. 8 screen three times. A number of small cups are then tightly packed with 30 gram portions of the composite and the surface thereof leveled.

The ester to be evaluated (itemized below) is dissolved in sufficient acetone to make a 1% by weight solution and then diluted with water to provide a formulation having a concentration of 0.1% by weight. To provide the desired concentration in the aforedescribed composite the following further dilutions with water are made:

Conc. desired in soil in p.p.m. _____ 30
Ml. of 0.1% formulation _____ 1
Ml. of water added to formulation _____ 3

The 4 ml. portions are drenched over the surface of the soil in each cup, care being taken to insure even distribution. The cups are then placed in a 100% humidity chamber at 70° F. for 44 hours. Upon removal from the chamber the amount of mycelial growth on the surface of the soil is noted and rated as follows:

1=no growth,
2=growth from corn meal only,
3=some growth in soil away from corn meal particles,
4=surface covered but little aerial growth,
5=growth equivalent to that on untreated soil.

The results obtained with several of the esters of this invention are set forth below for each of the two indicated fungal organisms:

A—2-nitro-n-butyl levulinate
B—2-nitroethyl levulinate

| Ester | Phythium ultimum at 30 p.p.m. | Rhizoctonia solani at 30 p.p.m. |
|---|---|---|
| A | 1 | 3 |
| B | 2 | 1 |

Although the novel fungicidal agents of this invention are useful per se in controlling a wide variety of fungal organisms, it is preferable that they be supplied to the organisms or to the environment of the organisms in a dispersed form in a suitable extending agent.

In the instant specification and appended claims it is to be understood that the term "dispersed" is used in its widest possible sense. When it is said that the fungicidal agents of this invention are dispersed, it means that the particles of the fungicidal agents of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal agents of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the fungicidal agents of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the fungicidal agents of this invention employed in combatting or controlling fungal organisms can vary considerably provided the required dosage (i.e., toxic or lethal amount) thereof is supplied to the organisms or to the environment of the organisms. When the extending agent is a liquid or mixture of liquids (e.g. as in solutions, suspensions, emulsions, or aerosols) the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the fungicidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the fungicidal agents of this invention are to be supplied to the fungal organisms or to the environment of the organisms as aerosols, it is convenient to dissolve them in a suitable solvent and disperse the resulting solution in dichlorodifluoromethane or like chlorofluoroalkane which boils below room temperature at atmospheric pressure.

The fungicidal agents of this invention are preferably supplied to the fungal organisms or to the environment of the organisms in the form of emulsions or suspensions. Emulsions or suspensions are prepared by dispersing one or more fungicidal agents of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York), in place of the expression "emulsifying agent" to connote generically the various "emulsifying agents," "dispersing agents," "wetting agents" and "spreading agents" that are adapted to be admixed with the fungicidal agents of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active substances which may be anion-active (or anionic), cation active (or cationic), or non-ionizing (or non-ionic) which are described in detail in volumes I and II of Schwartz, Perry and Berch's "Surface Active Agents and Detergents" (1958, Interscience Publishers, Inc., New York), and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The fungicidal agents of this invention can be dispersed by suitable methods (e.g., tumbling or grinding) in solid extending agents either of organic or inorganic nature and suppled to the fungal organism's environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for fungicidal purposes in the dry form, or, by addition of water-soluble surfactants or wetting agents the dry particulate solids can be rendered wettable by water so as to obtain stable aqueous dispersions or suspensions suitable for use as sprays.

For special purposes the fungicidal agents of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting fungal organisms or they can be provided in a concentrated form suitable for mixing with or disposing in other extending agents. As illustrative of a particularly useful concentrate is an intimate mixture of one or more fungicidal agents of this invention with a water-soluble surfactant which lowers the surface tension of water in the weight proportions of 0.1 to 15 parts of surfactant with sufficient of the fungicidal agent of this invention to make 100 parts by weight. Such a concentrate is particularly adapted to be made into a spray for combatting various forms of fungal organisms by the addition of water thereto. As illustrative of such a concentrate is an intimate mixture of 95 parts by weight of 2-nitroethyl levulinate and 5 parts by weight of a water-soluble non-ionic surfactant such as the polyoxyethylene derivative of sorbitan monolaurate.

Another useful concentrate adapted to be made into a spray for combatting fungal organisms is a solution (preferably as concentrated as possible) of one or more fungicidal agents of this invention in an organic solvent therefor. The said liquid concentrate preferably contains dissolved therein a minor amount (e.g., 0.5 to 10 percent by weight of the weight of the new fungicidal agent) of a surfactant (or emulsifying agent), which surfactant is also water-soluble. As illustrative of such a concentrate is a solution of 2-nitro-n-butyl levulinate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for fungicidal purposes, the active ingredients can be one or more of the compounds of this invention. The compounds of this invention can also be advantageously employed in combination with other pesticides, including, for example, insecticides, nematocides, bacterocides, and herbicides. In this manner it is possible to obtain mixtures which are effective against a wide variety of pests and other forms of noxious life.

In controlling or combatting fungal organisms the fungicidal agents of this invention either per se or compositions comprising same are supplied to the fungal organisms or to their environment in a lethal or toxic amount. This can be done by dispersing the new fungicidal agent or fungicidal composition comprising same in, on or over an infested environment or in, on or over an environment the fungal organisms frequent, e.g. agricultural soil or other growth media or other media infested with the fungal organisms or attractable to the organisms for habitational or sustenance or propagational purposes, in any conventional fashion which permits contact between the organisms and the fungicidal agents of this invention. Such dispersing can be brought about by applying the fungicidal agent per se or sprays or particulate solid compositions containing same to a surface infested with the fungal organisms or attractable to the organisms, as for example, the surface of agricultural soil or other media such as the above ground surface of plants by any of the conventional methods, e.g., power dusters, boom and hand sprayers, and spray dusters. Also for sub-surface application such dispersing can be carried out by simply mixing the new fungicidal agent per se or fungicidal spray or particulate solid compositions comprising same with the infested environment or with the environment the fungal organisms frequent, or by employing a liquid carrier for the new fungicidal agent to accomplish sub-surface penetration and impregnation therein.

What is claimed is:
1. The method which comprises applying to fungal organisms in their horticultural habitats at least one ester of the formula

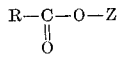

wherein Z is nitro substituted alkyl containing 2 to 6 carbon atoms the nitro substituent of which being attached to a carbon atom at least one carbon atom removed from the carbonyloxy radical, and wherein R is oxoalkyl terminating with a CH$_3$— group and containing 2 to 7 carbon atoms.

2. The method which comprises applying to fungal organisms in their horticultural habitats at least one ester of the formula

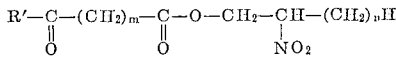

wherein R' is alkyl containing 1 to 3 carbon atoms, wherein $m$ is an integer from 0 to 3, inclusive, and wherein $n$ is an integer from 0 to 3, inclusive.

3. The method which comprises applying to fungal organisms in their horticultural habitats 2-nitro-n-butyl levulinate.

4. The method of controlling soil borne fungi which comprises applying to soil at least one ester of the formula

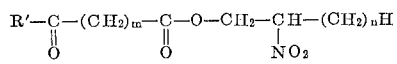

wherein R' is alkyl containing 1 to 3 carbon atoms, wherein $m$ is an integer from 0 to 3, inclusive, and wherein $n$ is an integer from 0 to 3, inclusive.

5. A fungicidal composition comprising a ketocarboxylate dispersed in an extending agent, the composition containing 0.1 to 25 percent by weight of said ketocarboxylate, the extending agent being selected from the group consisting of solid and semi-solid extending agents, the said ketocarboxylate being of the formula

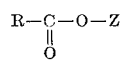

wherein Z is nitro substituted alkyl containing 2 to 6 carbon atoms the nitro substituent of which being attached to a carbon atom at least one carbon atom removed from the carbonyloxy radical, and wherein R is oxoalkyl terminating with a CH$_3$— group and containing 2 to 7 carbon atoms.

6. A fungicidal composition comprising a ketocarboxylate dispersed in a liquid extending agent, the composition containing 0.001 to 50 percent by weight of said ketocarboxylate, the said ketocarboxylate being of the formula

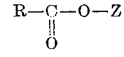

wherein Z is nitro substituted alkyl containing 2 to 6 carbon atoms the nitro substituent of which being attached to a carbon atom at least one carbon atom removed from the carbonyloxy radical, and wherein R is oxoalkyl terminating with a CH$_3$— group and containing 2 to 7 carbon atoms.

7. A fungicidal composition comprising a ketocarboxylate dispersed in an adsorbent clay, the composition containing 0.1 to 25 percent by weight of said ketocarboxylate, the said ketocarboxylate being of the formula

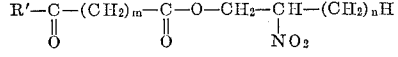

wherein R' is alkyl containing 1 to 3 carbon atoms, wherein $m$ is an integer from 0 to 3, inclusive, and wherein $n$ is an integer from 0 to 3, inclusive.

8. A fungicidal composition comprising a ketocarboxylate and a fungicidal adjuvant, said concentrate containing from 5 to 95 percent by weight of said ketocarboxylate, the said ketocarboxylate being of the formula

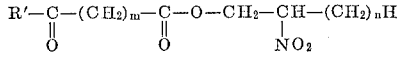

wherein R' is alkyl containing 1 to 3 carbon atoms, wherein $m$ is an integer from 0 to 3, inclusive, and wherein $n$ is an integer from 0 to 3, inclusive.

9. A fungicidal concentrate comprising a ketocarboxylate of the formula

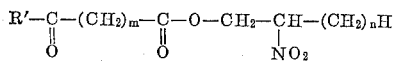

wherein R' is alkyl containing 1 to 3 carbon atoms, wherein $m$ is an integer from 0 to 3, inclusive, and wherein $n$ is an integer from 0 to 3, inclusive, dispersed in an organic solvent therefor and having dissolved therein a minor amount of a surfactant, said concentrate forming an emulsion with water upon agitation therewith.

10. A fungicidal concentrate adapted to be made into a sprayable composition by the addition of water comprising a ketocarboxylate in admixture with a water-soluble surfactant in the weight proportion of 0.1 to 15 parts of surfactant and sufficient of said ketocarboxylate to make 100 parts by weight, the said ketocarboxylate being of the formula

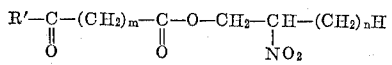

wherein R' is alkyl containing 1 to 3 carbon atoms, wherein $m$ is an integer from 0 to 3, inclusive, and wherein $n$ is an integer from 0 to 3, inclusive.

11. The fungicidal concentrate of claim 9 wherein the ketocarboxylate is 2-nitrobutyl levulinate.

12. The fungicidal concentrate of claim 10 wherein the ketocarboxylate is 2-nitrobutyl levulinate.

References Cited by the Examiner
UNITED STATES PATENTS

| | | | |
|---|---|---|---|
| 2,336,318 | 12/1943 | Thurston et al. | 260—484 |
| 3,098,039 | 7/1963 | Hodge | 252—8.55 |

OTHER REFERENCES

Lyons et al.: Journal of the American Chemical Society, vol. 39, pp. 1727–1750 (1917) (pp. 1731, 1732, and 1749 relied on).

JULIAN S. LEVITT, *Primary Examiner.*